United States Patent
Kwok et al.

(10) Patent No.: US 6,801,280 B2
(45) Date of Patent: Oct. 5, 2004

(54) REFLECTIVE LIQUID CRYSTAL DISPLAYS HAVING MULTILAYER REAR SUBSTRATES

(75) Inventors: Hoi-Sing Kwok, Kowloon (HK); Shu-Tuen Tang, New Territories (HK); Kin Ming Fung, Kowloon (HK)

(73) Assignee: The Hong Kong University of Science and Technology, Kowloon (HK)

( * ) Notice: Subject to any disclaimer, the term of this patent is extended or adjusted under 35 U.S.C. 154(b) by 0 days.

(21) Appl. No.: 10/341,255

(22) Filed: Jan. 14, 2003

(65) Prior Publication Data

US 2003/0133063 A1 Jul. 17, 2003

Related U.S. Application Data

(60) Provisional application No. 60/347,890, filed on Jan. 15, 2002.

(51) Int. Cl.$^7$ .............................................. G02F 1/1335
(52) U.S. Cl. ........................................ 349/113; 349/147
(58) Field of Search ................................ 349/113, 114, 349/115, 147

(56) References Cited

U.S. PATENT DOCUMENTS

| | | | | |
|---|---|---|---|---|
| 4,648,691 A | * | 3/1987 | Oguchi et al. .............. | 349/162 |
| 5,189,537 A | * | 2/1993 | O'Farrell ..................... | 349/195 |
| 5,729,313 A | * | 3/1998 | Mitsui ......................... | 349/106 |
| 5,990,995 A | * | 11/1999 | Ebihara et al. ............. | 349/113 |
| 6,219,120 B1 | * | 4/2001 | Sasaki et al. ............... | 349/113 |
| 6,259,499 B1 | * | 7/2001 | Yamanashi .................. | 349/113 |
| 6,552,765 B2 | * | 4/2003 | Kurata ........................ | 349/113 |
| 6,661,483 B1 | * | 12/2003 | Moriwaki et al. .......... | 349/102 |

* cited by examiner

Primary Examiner—Robert H. Kim
Assistant Examiner—Andrew Schechter
(74) Attorney, Agent, or Firm—Burns, Doane, Swecker & Mathis, L.L.P.

(57) ABSTRACT

There is provided a reflective liquid crystal cell formed of a liquid crystal material disposed between first and second substrates. The first substrate is optically transparent and is formed with a coating of optically transparent and electrically conductive material on the side facing the liquid crystal material. The second substrate is formed with a plurality of coatings on the side facing the liquid crystal material. These coatings include in sequence a layer of metallic reflective material, a layer of electrically insulating material, a layer of na optically transparent and conductive material and a liquid crystal alignment layer.

16 Claims, 4 Drawing Sheets

REFLECTIVE LIQUID CRYSTAL DISPLAYS HAVING MULTILAYER REAR SUBSTRATES

This application claims priority under 35 U.S.C. § 119 to U.S. Provisional Application No. 60/347,890 entitled Structures for Reflective Liquid Crystal and filed on Jan. 15, 2002, the entire content of which is hereby incorporated by reference.

FIELD OF THE INVENTION

This invention relates to the structure of a reflective liquid crystal display, and in particular to the structure of such a display that has only one polarizer.

BACKGROUND TO THE INVENTION

A conventional liquid crystal display is shown in FIG. 1. Such a conventional display normally comprises both a front polarizer 1 and a rear polarizer 4. A liquid crystal cell is placed between these polarizers 1,4 and the cell in turn comprises two sheets of transparent glass 2,3 held apart by spacers 7 and containing the liquid crystal 6. A voltage applied to the liquid crystal cell controls the polarization of the light and this voltage is applied through two transparent conductive coatings 14,15 formed on the insides of the two glass sheets 2,3 facing the liquid crystal 6. A diffusive reflector 16 is placed behind the rear polarizer 4 for viewing the display from the front.

PRIOR ART

In U.S. Pat. No. 5,926,545 Kwok et al disclose a new type of reflective liquid crystal display where there is only one front polarizer 1 and the rear polarizer can be omitted. This design is shown in FIG. 2. In this arrangement it is necessary for the reflector 8 to be placed inside the liquid crystal cell and the reflector 8 must meet a number of requirements.

SUMMARY OF THE INVENTION

In particular, it is necessary for the reflector to reflect incident light with good efficiency. It has to be conductive and patternable into various electrode shapes and configurations for the application of a voltage to the liquid crystal cell. The patterned electrodes and the background also have to be of the same colour and shade for the design to be aesthetically pleasing. Additionally the rear reflector may be textured to give a degree of scattering of light.

According to the present invention there is provided a reflective liquid crystal display comprising a liquid crystal cell formed of a liquid crystal material disposed between first and second substrates, wherein said first substrate is optically transparent and is formed with a coating of optically transparent and electrically conductive material on the side of said first substrate facing said liquid crystal material, said coating being further provided with a liquid crystal alignment layer, and wherein said second substrate is formed with a plurality of coatings on the side of the second substrate facing the liquid crystal material, said coatings comprising in sequence a layer of metallic reflective material deposited on the surface of the second substrate, a layer of an electrically insulating material, a layer of an optically transparent and electrically conductive material, and a liquid crystal alignment layer.

The electrically insulating layer is preferably made to be thick enough (about 1 micron) to avoid the possibility of any pinholes that form a short between the metallic reflective layer and the electrically conductive layer. As a further protection, however, the metallic reflective layer may be divided into electrically isolated regions (for example a regular geometric pattern of squares, rectangles, circles or polygons).

Possible materials for the reflective material include aluminium, gold, silver, chromium, tin, zinc and iron.

The metallic reflective layer may be formed by sputtering in a partial vacuum or by vacuum evaporation. The deposition conditions may be controlled to give a partially light scattering surface. The metallic layer may have a thickness of between 0.01 and 1 micron.

Possible materials for the electrically insulating layer include silicon oxide, aluminium oxide, magnesium oxide, zirconium oxide or titanium oxide. The insulating layer may also be formed of an organic polymer material.

Possible materials for the electrically conductive layer include conductive oxides such as indium tin oxide, tin oxide, zinc oxide, gallium oxide or indium gallium oxide. The conductive layer could also be formed of the same material as the metallic reflective layer.

According to another aspect the present invention provides a reflective liquid crystal display comprising a liquid crystal cell formed of a liquid crystal material disposed between first and second substrates, wherein said first substrate is optically transparent and is formed with a coating of optically transparent and electrically conductive material on the side of said first substrate facing said liquid crystal material, said coating being further provided with a liquid crystal alignment layer, and wherein said second substrate is formed with a plurality of coatings on the side of the second substrate facing the liquid crystal material, said coatings comprising in sequence a layer of electrically insulating reflective material deposited on the surface of the second substrate, a layer of an optically transparent and electrically conductive material, and a liquid crystal alignment layer.

The electrically insulating reflective surface may be provided with a partially light scattering surface and may be formed of a dye-doped polymer material.

According to a further aspect of the present invention there is provided a reflective liquid crystal display comprising a liquid crystal cell formed of a liquid crystal material disposed between first and second substrates, wherein said first substrate is optically transparent and is formed with a coating of optically transparent and electrically conductive material patterned into strips on the side of said first substrate facing said liquid crystal material, said coating being further provided with a liquid crystal alignment layer, and wherein said second substrate is formed with a plurality of coatings on the side of the second substrate facing the liquid crystal material, said coatings comprising in sequence a layer of metallic reflective material deposited on the surface of the second substrate and patterned into parallel strips, and a liquid crystal alignment layer.

BRIEF DESCRIPTION OF THE DRAWINGS

Some embodiments of the invention will now be described by way of example and with reference to the accompanying drawings, in which.

DETAILED DESCRIPTION OF PREFERRED EMBODIMENTS

Figure 1:
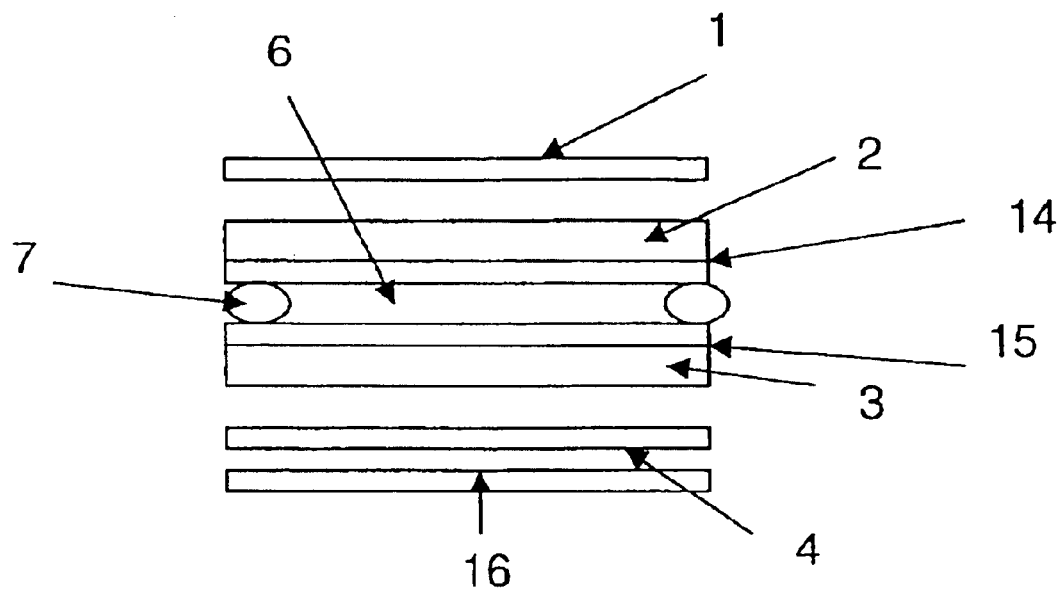
FIG. 1 shows the structure of a conventional liquid crystal display.
Figure 2:
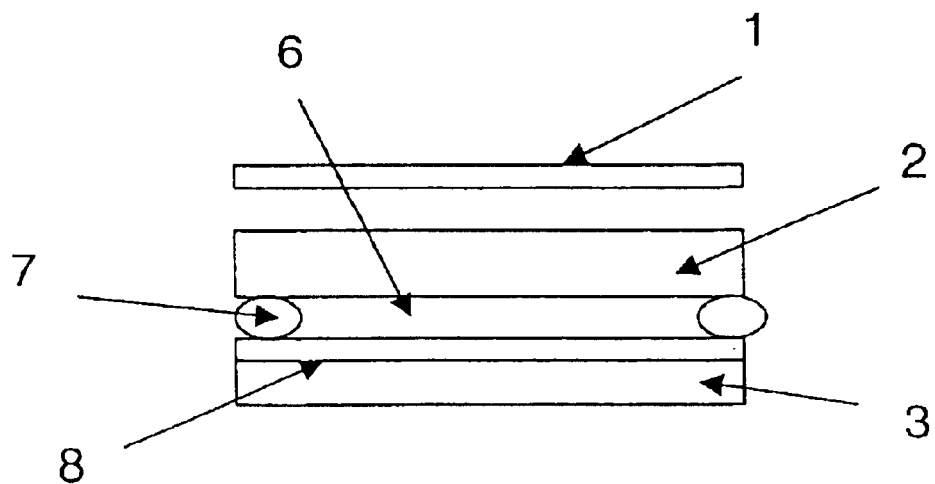
FIG. 2 shows the structure of a reflective liquid crystal display.
Figure 3:
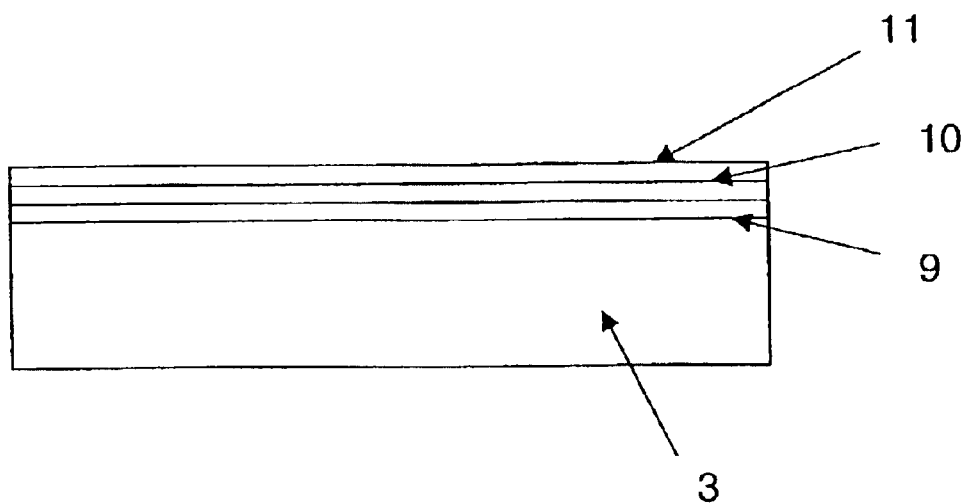
FIG. 3 shows a first embodiment of the invention.

In a first embodiment of the invention shown in FIG. 3, the rear reflector comprises three coatings applied to a substrate 3, which may be glass, metallic or any other suitable materials. The three coatings may be applied using various thin film deposition techniques including electron beam or thermal evaporation, DC or RF sputtering, pulsed laser deposition, spin coating, dip coating or other methods.

The first layer 9 coated on the substrate is a reflective layer. This layer may be a simple metal layer such as aluminium, gold, silver, chromium, titanium, tin, zinc, and iron. The reflective layer should be designed to reflect light with high efficiency and the reflective layer will determine the colour of the background of the display. The reflective layer is formed by sputtering in a partial vacuum or by vacuum evaporation to a thickness of between 0.01 and 1 micron.

The second layer 10 is an insulating layer that may be formed of any of a large variety of materials such as silicon oxide, magnesium oxide and zirconium oxide. The thickness of the insulating layer 10 should preferably be such as to minimise the possibility of there being any pinholes in the layer that may cause a short between the reflective layer 9 and the conductive layer 11, for example about 1 micron.

The third layer 11 is a transparent electrically conductive layer that forms the electrodes for the liquid crystal display. One possible class of materials for this layer includes conductive oxide materials such as indium tin oxide (ITO), tin oxide, zinc oxide, gallium oxide, or indium gallium oxide. The conductive layer should be thin enough so that light loss owing to absorption in the conductive layer is minimal (eg between 0.01 and 1 micron). The conductive layer 11 may be patterned into various shapes as required for the electrode structure, and an alignment layer (eg a polyimide layer) may be provided on top of the transparent conductive layer.

It is also possible for the reflective layer 9 and the conductive layer 11 to be formed of the same material, such as a metal. If both layers 9 and 11 are formed of the same material then the formation of electrode structures on layer 11 will not form an image visible to the eye. This is preferable because it means that the display will not provide an image of the electrodes when in a no-voltage state and that the image is governed solely by the applied voltage.

In a variation of the embodiment of FIG. 3, the reflective layer 9 may be treated to have a scattering finish. This treatment can be by way of chemical etching of the reflective layer 9 before deposition of the insulating layer 10. The chemical etching process can be controlled to give different degrees of a rough structure to the reflective layer 9 to provide different degrees of scattering. Alternatively, the deposition conditions can be altered during the deposition process in order to give uneven deposition. This can be done, for example, by varying the chamber pressure during normal sputtering.

Figure 4:
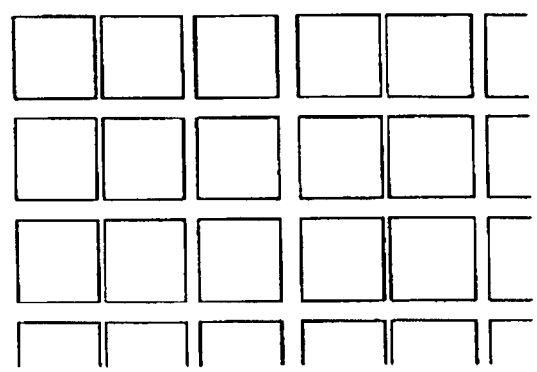
FIG. 4 shows a second embodiment of the invention.
Figure 5:
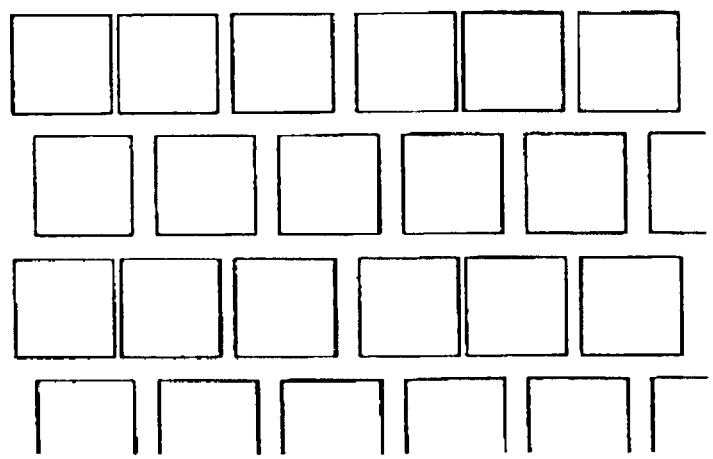
FIG. 5 shows a third embodiment of the invention.
Figure 6:
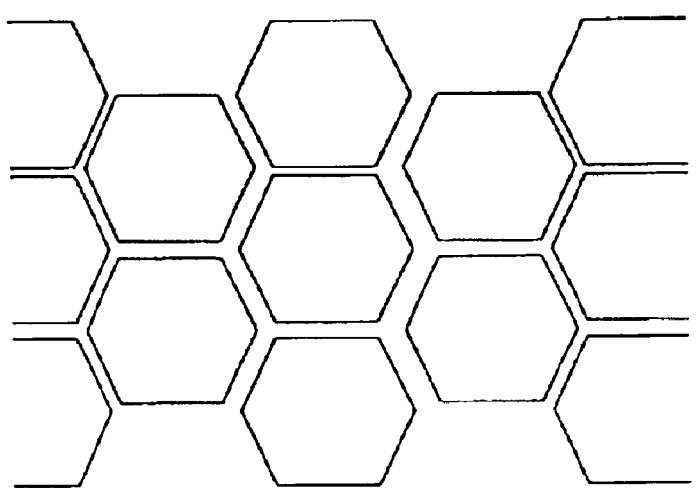
FIG. 6 shows a fourth embodiment of the invention.

A second embodiment of the invention is shown in FIG. 4. This embodiment is the same as the embodiment of FIG. 3, save that the reflective layer is patterned into squares so that the reflective layer is not continuous. The significance of this is that if the reflective layer 9 is also conductive, if for example it is formed of a metal, and if there are any pinholes in the insulating layer 10, the discontinuities in the reflective layer minimise the effects of any conductive shorts between the reflective layer 9 and the conductive layer 11. FIG. 5 shows a further embodiment that has the same effect as FIG. 4 in which the reflective layer is patterned into a brick-like arrangement of rectangles. FIG. 6 shows a further embodiment in which the reflective layer is patterned into hexagons. Circles or other regular polygons are also possible.

Figure 7:
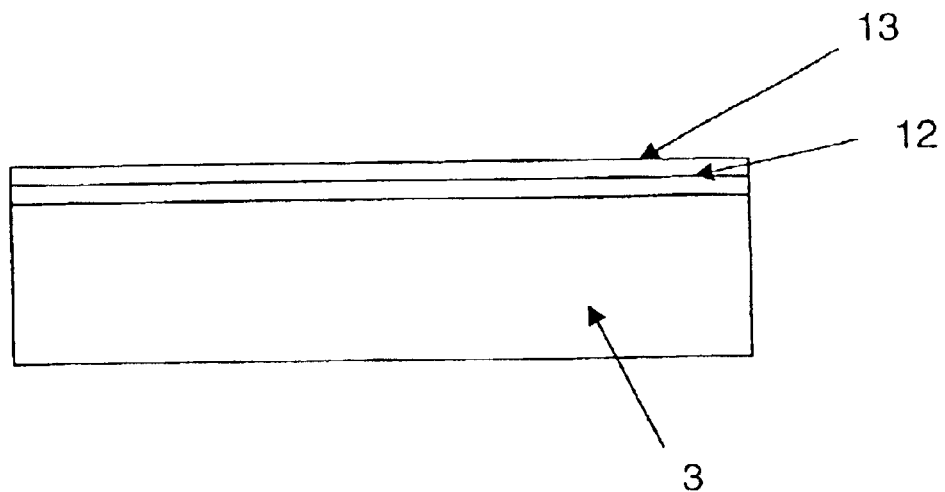
FIG. 7 shows a fifth embodiment of the invention.

FIG. 7 shows a fifth embodiment of the invention in which there are only two layers 12,13 on top of the substrate 3. In this embodiment the first layer 12 combines both the functions of the reflective layer and the insulating layer and is formed of a reflective insulating material. This layer can also be an effusive scattering layer and is preferably constructed of polymeric materials. The polymer can also be dye-doped to provide colour. Layer 13 is a transparent conductive layer formed of a material such as ITO and forms the electrode layer for the liquid crystal display.

Figure 8:
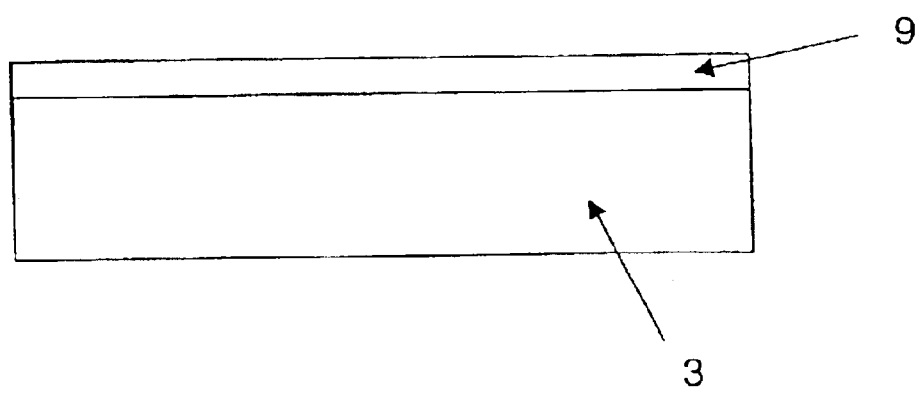
FIG. 8 shows a sixth embodiment of the invention.

In the sixth embodiment of the invention, shown in FIG. 8, there is only a single layer coated onto the substrate 3. In this embodiment a metal coating is patterned into parallel strips as in a conventional supertwisted nematic liquid crystal display (STN). The spacing between the strips is kept to a minimum so that it will not be visible to the naked eye. In combination with strips similarly patterned on the electrode layer 14 formed on the opposite substrate 2 this STN forms the matrix display, displaying dots in a rectangular matrix. The metal layer 9 forms both the reflector and the electrode for the passive matrix. The metal layer 9 can have a shiny finish, or can be made into a scattering surface by an appropriate treatment of the metal as discussed above.

What is claimed is:

1. A reflective liquid crystal display comprising a liquid crystal cell formed of liquid crystal material disposed between first and second substrates, wherein said first substrate is optically transparent and is formed with a coating of optically transparent and electrically conductive material on the side of said first substrate facing said liquid crystal material, said coating being further provided with a liquid crystal alignment layer, and wherein said second substrate is formed with a plurality of coatings on the side of the second substrate facing the liquid crystal material, said coatings comprising in sequence a layer of metallic reflective material deposited on the surface of the second substrate, a layer of an electrically insulating material, a layer of an optically transparent and electrically conductive material formed of the same material as said layer of metallic reflective material, and a liquid crystal alignment layer.

2. A display as claimed in claim 1 wherein the metallic reflective layer formed on the surface of said second substrate is divided into electrically disconnected regions.

3. A display as claimed in claim 2 wherein said regions are a pattern of regular geometric figures.

4. A display as claimed in claim 3 wherein said geometric figures include squares, rectangles, circles or polygons.

5. A display as claimed in claim 1 wherein the layer of reflective material formed on the surface of the second substrate is formed of a material selected from the group consisting of aluminium, gold, silver, chromium, titanium, tin, zinc and iron.

6. A display as claimed in claim 1 wherein the metallic reflective layer formed on said second substrate is formed with a partially light scattering surface.

7. A display as claimed in claim 6 wherein said partially light scattering surface is formed by varying the conditions of a metal deposition process to form said metallic layer.

8. A display as claimed in claim 1 wherein said metallic reflective layer is formed by sputtering in a partial vacuum or by vacuum evaporation.

9. A display as claimed in claim 1 wherein said metallic reflective layer is formed with a thickness of between 0.01 and 1 micron.

10. A display as claimed in claim 1 wherein said electrically conductive layer formed on said second substrate is between 0.01 to 1 micron in thickness.

11. A display as claimed in claim 1 wherein said electrically insulating layer is formed of a material selected from the group consisting of silicon oxide, aluminium oxide, magnesium oxide, zirconium oxide or titanium oxide.

12. A display as claimed in claim 1 wherein said electrically insulating layer is formed of an organic polymer material.

13. A display as claimed in claim 1 wherein said electrically insulating layer is at least 1 micron in thickness.

14. A display as claimed in claim 1 wherein said electrically insulating layer is formed by sputtering in a partial vacuum, or by vacuum evaporation or by spin coating.

15. A reflective liquid crystal display comprising a liquid crystal cell formed of a liquid crystal material disposed between first and second substrates, wherein said first substrate is optically transparent and is formed with a coating of optically transparent and electrically conductive material on the side of said first substrate facing said liquid crystal material, said coating being further provided with a liquid crystal alignment layer, and wherein said second substrate is formed with a plurality of coatings on the side of the second substrate facing the liquid crystal material, said coatings comprising in sequence a layer of electrically insulating reflective material deposited on the surface of the second substrate and having a partially light scattering surface, a layer of an optically transparent and electrically conductive material, and a liquid crystal alignment layer.

16. A display as claimed in claim 15 wherein said electrically insulating reflective layer is formed of a dye doped polymer material.

* * * * *